Nov. 21, 1950 D. L. BLANEY 2,530,562
MONITORING SYSTEM FOR MAGNETIC RECORDING
Filed June 30, 1948
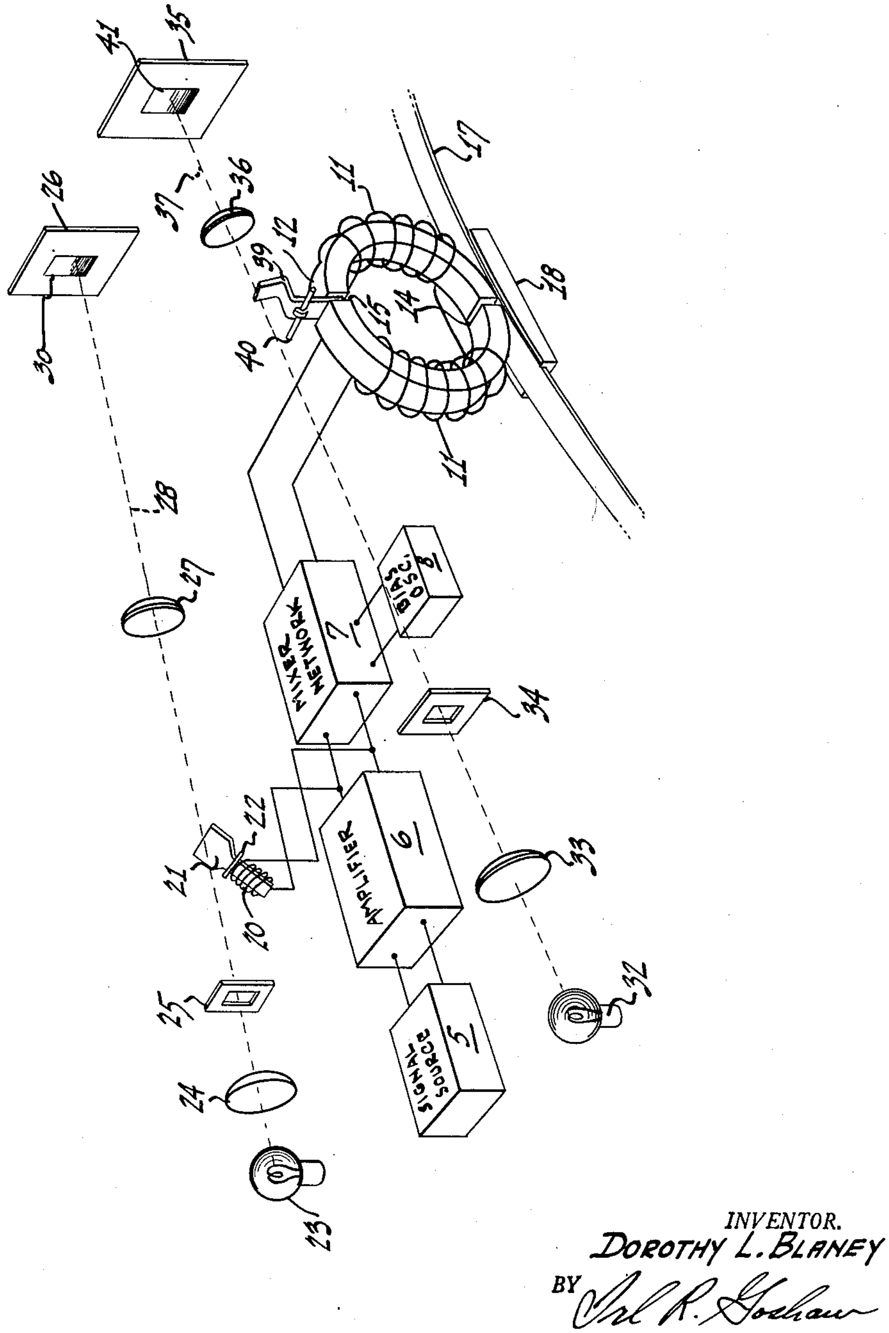
INVENTOR.
DOROTHY L. BLANEY
BY Orl R. Goshaw
ATTORNEY Patented Nov. 21, 1950 2,530,562

UNITED STATES PATENT OFFICE 2,530,562

MONITORING SYSTEM FOR MAGNETIC RECORDING

Dorothy L. Blaney, Los Angeles, Calif., assignor to Radio Corporation of America, a corporation of Delaware Application June 30, 1948, Serial No. 36,046

5 Claims. (Cl. 179—100.2)

This invention relates to sound recording, and particularly to a monitoring system for magnetic sound recording systems, wherein the type of visual indications are those of a type used in recording photographic records.

In well-known types of photographic sound recording systems, the amplitude of a signal being impressed on the recording modulator is indicated by a light beam which vibrates across an observation screen in accordance with the variations in amplitude of the signal. By use of such a monitoring light beam, a preliminary adjustment of the modulator may be made, and also, the signal amplitude may be controlled as it is fed to the modulator. The present invention provides such a vibrating type of monitoring light beam, not only for the signal at the modulator, but a monitoring beam for the signal at one or more points in the system, thus permitting the operator to determine losses between various points at which a signal is being monitored. The monitoring devices are simple and efficient and provide a direct reading monitor.

The principal object of the invention, therefore, is to facilitate the monitoring of a magnetic sound recording system.

Another object of the invention is to provide an improved system for monitoring a magnetic sound recording system.

A further object of the invention is to provide monitoring indications of signal variations as they are actually impressed on the record medium by a magnetic recording head and as impressed at a point in the recording system prior to the head.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a diagrammatic view of a magnetic sound recording system embodying the invention.

Referring now to the drawing, the signal from a source 5, such as a microphone or other type of sound pickup device, is amplified in amplifier 6 and fed into a mixer network 7 which is also fed from a bias oscillator 8. The output of the mixer network is then impressed upon a winding 11 surrounding a core 12 having a recording gap 14 and a monitoring gap 15. Except for the monitoring gap 15, the system just described is the usual type of system used for magnetic recording, wherein the variations in magnetism across the gap 14 are impressed upon a magnetic tape or film 17 passing across the gap over a shoe 18. The tape may also pass over the gap in a reverse curvature, thus avoiding the use of the shoe 18.

Bridged between the amplifier 6 and network 7, is a coil 20 surrounding an armature 21 pivoted at 22. Variations in the signal strength in the coil 20 will vary the position of the upper edge of the armature 21. Light from a light source 23 being collected by a lens 24 is formed into a beam by the aperture in a plate 25 and projected to a screen 26 by a lens 27, as shown by the dotted line 28. The light beam passes the upper edge of the armature 21, and, as the armature is varied by the signal strength, the image 30 is lengthened and shortened in accordance with the amplitude of the signal. Thus, the image 30 will show the signal amplitude at the output of the amplifier 6. It is to be understood that the coil 20 may be fed from some other point in the system.

Light from a second light source 32 is collected by a lens 33, formed into a beam by the aperture in a plate 34, and projected to a screen 35 by a lens 36, as indicated by the dotted line 37. This beam passes the upper edge of an armature 39 pivoted at 40, which is so positioned with respect to the light beam, that movements of the end of the armature 39 within gap 15 will vary the size of an image 41 on the screen 35. Any desired degree of movement of the upper edge of the armature 39 may be obtained, even for extremely slight movements of the end of the armature 39 in the gap 15, simply by changing the length of the armature 39 and the fulcrum or pivot point 40. This rear gap for recording heads may be approximately fifteen thousandths of an inch wide and the portion of the armature in the gap may be approximately five thousandths of an inch thick, thus providing a ten thousandths of an inch movement within the gap.

The monitoring light beam 37 provides an exact indication of the strength of the signal in the winding 11, and consequently, the strength of the signal, as impressed on the magnetic tape 17, and any variations between the images 30 and 41, provide an indication of the loss of the signal between the output of amplifier 6 and the recording head. The types of images shown at 30 and 41 are those to which photographic sound recording operators are familiar, and thus, adjustments or control of the elements of the recording system are facilitated.

Although light image monitoring systems are shown, it is realized that a portion of the current in coil 20 may also be impressed on a volume indicator or oscilloscope, while a portion of the current in the coil 11 may be impressed on a similar volume indicator or oscilloscope which will permit an accurate comparison of the currents and waveforms thereof at these points in the system.

I claim:

1. In a magnetic sound recording system, a signal source, a recording head having a recording gap and a second gap diametrically opposite said recording gap, an amplification channel connected between said signal source and said head, an armature having one end in said last mentioned gap, a source of light, means for forming light from said source into a beam, an observation medium, means for simultaneously varying the magnetism in said gaps produced by said signal, the end of said armature moving in the gap in which it is positioned in accordance with the variations in magnetism in said gaps, means for directing said beam of light to said observation medium, and means whereby the other end of said armature varies said light beam in accordance with the variation in magnetism in said recording gap caused by said signal.

2. A system in accordance with claim 1, in which a second light source and light beam forming elements are provided, together with an armature, means for moving said second mentioned armature in accordance with the value of said signal at a predetermined point in said channel, said armature varying said second light beam in accordance with the signal at said point.

3. A monitoring system for indicating the strength of a sound recording magnetic field, comprising a signal transmission circuit, a magnetic recording head connected to said circuit and having a core and a winding thereon, said core having a recording gap and a second gap, a pivoted armature having one end in said second gap, a light source, means for forming light from said source into a light beam, and means whereby the other end of said armature varies said beam in accordance with the variations in magnetism in said core.

4. A monitoring system in accordance with claim 3, in which means for forming and observing an image of said light beam is provided, said image being varied by said armature.

5. A monitoring system in accordance with claim 3, in which a second light source and light beam forming elements are provided, together with a coil and armature for varying said second light beam, and connections between said coil and said signal transmission circuit.

DOROTHY L. BLANEY.

REFERENCES CITED

The following references are of record in the file of this patent:

UNITED STATES PATENTS

| Number | Name | Date |
|---|---|---|
| 1,951,716 | Varian | Mar. 20, 1934 |